United States Patent [19]
Henderson et al.

[11] Patent Number: 6,068,349
[45] Date of Patent: May 30, 2000

[54] BICYCLE WHEEL HUB HOUSING, WEB, AND FLANGE ASSEMBLY FOR BICYCLE ET AL, WITH MAINTENANCE OF CHAIN ON SPROCKET COGS

[75] Inventors: William R. Henderson, Bullhead City, Ariz.; Larry W. Henderson; Dacques Downey, both of Chico, Calif.

[73] Assignee: Seismic Industries Corporation, Oroville, Calif.

[21] Appl. No.: 08/905,656

[22] Filed: Aug. 4, 1997

[51] Int. Cl.[7] .................................................. B60B 1/02
[52] U.S. Cl. .......................................... 301/61; 301/110.5
[58] Field of Search ................................ 301/55, 56, 57, 301/59, 61, 110.5, 104, 105.1

[56] References Cited

U.S. PATENT DOCUMENTS

| | | | |
|---|---|---|---|
| D. 267,169 | 12/1982 | Suzuki et al. | D12/205 |
| 414,369 | 11/1889 | Bettendorf | 301/59 |
| 1,393,441 | 10/1921 | Heales | 301/59 |
| 1,534,934 | 4/1925 | Ferrabino | 301/56 |
| 1,588,957 | 6/1926 | Ferrabino | 301/56 |
| 3,645,580 | 2/1972 | Spies | 301/55 |
| 4,567,973 | 2/1986 | Butz | 301/105 |
| 4,626,036 | 12/1986 | Hinsberg et al. | 301/59 |
| 5,163,740 | 11/1992 | Kawai et al. | 301/110.5 |
| 5,324,100 | 6/1994 | James | 301/105.1 |
| 5,445,439 | 8/1995 | Dietrich | 301/55 |
| 5,489,147 | 2/1996 | Borsai | 301/59 |

FOREIGN PATENT DOCUMENTS

| | | | |
|---|---|---|---|
| 109052 | 2/1925 | Switzerland | 301/56 |

*Primary Examiner*—S. Joseph Morano
*Assistant Examiner*—Long Bao Nguyen
*Attorney, Agent, or Firm*—Frank L. Zugelter

[57] ABSTRACT

Spoked wheel assemblies (22, 55) having included angles (50, 70) about a center line (20) passing through tire rims (25, 78) and a midway point on a distance between forks, yielding uniform tension in their sets of spokes (30, 31/76, 77) forming the included angles (50, 70) that are equally divided about their corresponding line (20). A front wheel hub assembly (37) includes a housing 27, a web 28 mounted thereon and passing through the center line (20), a circumferential member (29) mounted to web (28), and a pair of flanges (23) spacedly mounted on member (29). Openings (34) are provided in assembly (37) to lessen weight. A drive hub assembly includes a housing (71), an included angle (70) equally divided about its line (20), a web (72) mounted on housing (71), a circumferential support member (73) mounted on web (72), spaced flanges (74) with their apertures (24) for spokes (76, 77), and a circumferential ring (97) formed on the perimeter (98) of member (73) to maintain a vehicle's chain (100) on the cogs of an adjacently disposed sprocket (99a). Angular inclinations (35) for circumferential member (73) draw the flanges (74) yet closer to the rim (78) of the wheel. Uniform tension and strength in both front and rear or drive wheel assemblies are achieved.

23 Claims, 3 Drawing Sheets

BICYCLE WHEEL HUB HOUSING, WEB, AND FLANGE ASSEMBLY FOR BICYCLE ET AL, WITH MAINTENANCE OF CHAIN ON SPROCKET COGS

TECHNICAL FIELD

This invention relates to spoked wheels, such as bicycle wheels, and particularly to a novel hub assembly and to an element in the assembly for maintaining a bike chain on the cogs of a sprocket and which, without it, otherwise could be deflected in a direction affording likelihood of damage to the bicycle's spokes and the hub's housing.

BACKGROUND OF THE INVENTION a. Prior Art Disclosures

Prior art teachings of which the inventors have knowledge are disclosed in the following U.S. Pat. Nos. 3,865,220; 3,871,710; 3,967,856; 4,278,265; 4,913,500; 5,326,331; 5,332,295; 5,445,439; and 5,487,592.

b. Problems in the Art

A major challenge to protect spokes, particularly bicycle spokes, from being jammed or damaged by a chain that leaves its sprocket, usually in the step of gear over-shifting, has been addressed and as illustrated in U.S. Pat. No. 4,278,265, directed to a spoke protector formed of synthetic resin, and in U.S. Pat. No. 5,326,331, directed to a guard that hooks onto the spokes. In the instant invention, a ring is provided in the hub assembly and which maintains the chain on the cogs of the sprocket adjacent to the hub assembly, without the chain jumping from the cogs, in an over-shifting of the gears or otherwise, to interfere with the spokes thereby, and either requiring a halt to bicycling to replace the chain on one of its sprockets or damaging them. In addition, the invention's hub assembly entirely precludes any interference of chain and spoke, with or without the ring.

Further, wheel weakness exists in both conventional front and rear wheels. In conventional rear wheels, there is an uneven included angle for the spokes, the included angle formed by its portions to each side of the center line or plane passing through the wheel's rim and a central point in the distance between the pair of forks to which a hub assembly mounts. Longer spokes in a first set of spokes mount between rim and the flange on the end of the hub opposite its end at which sprockets are mounted. Less tension is provided on these spokes than the tension on the shorter spokes in a second set of spokes that mount to the flange immediately adjacent sprockets that mount to the hub's other end. The uneven spoke tension between these two sets of spokes results in a weak wheel, a weaker wheel to say the least.

The uneven included angle results from sprockets conventionally added to the one end of the hub's housing, the angle portion (with the second or shorter set of spokes) being reduced, thereby producing the uneven or non-uniform tension between the first or longer and the second or shorter sets of spokes. When a force or thrust is imparted to the rim at 90 degrees to the center line or plane of the wheel, not absorbed by the wheel, the first set tends to collapse while the second set of spokes tends to stretch. When a sufficient force or thrust is imparted to the rim at 90 degrees to the center line or plane of the wheel, not absorbed by the wheel, the second set tends to collapse while the first set of spokes tend to stretch. The wheel, of course, could collapse or otherwise be damaged because of this weakness or become more weak without apparent manifestation of it.

As to the front wheel, the spokes are generally of even length in both sets of spokes and the included angle is generally evenly distributed about the center line or plane passing through rim and the noted central point. However, with longer spokes for both sets, the included angle is smaller rather than greater and this makes for a weaker wheel than were the included angle to be greater with shorter spokes.

This invention addresses the above noted disadvantages and removes the weaknesses in both front and rear spoked wheels, particularly as applied to bicycle wheels.

Strength in both front and rear bicycle wheels is an advantage in any reasonable use of a bicycle (or in any other spoked-wheel vehicle). As an example, in mountain bike racing, because of the front wheel's manipulation, in terms of turning the front wheel back and forth as well as it being bounced up and down, as the bike is maneuvered along rugged, rocky terrain on tortuous paths, conventional front wheels of bikes in mountain racing in many instances end up buckled or collapsed because of the lack of wheel strength to take the forces or thrusts imparted to it, even though the included angle for both sets of spokes in the front wheel is generally evenly distributed about the noted center line or plane. In this invention, since the spoke flanges ( in the invention's hub) are disposed or situated closer to the rim (in the rear wheel as well), as they are separated from, i.e., no longer being spoke flanges attached to a conventional hollow tubular member or shell (deemed to be a hub), both angular portions (to each side of the wheel's center line or plane) of the included angle are increased, increasing the included angle for the front wheel, although the included angle for the rear wheel is not increased, and substantially, if not fully, providing for an equalization of such angular portions in both wheels, to produce an even or uniform spoke tension in both sets of spokes for each of such wheels. The strength that now is incorporated into the wheels eliminates wheel failure.

SUMMARY OF THE INVENTION

The invention is directed to a wheel and its hub housing, a web member mounted to the hub housing, a circumferential member mounted to the web member, and apertured flanges spacedly mounted from one another mounted on the circumferential member, the flanges thus being drawn closer to the rims of their wheels, resulting from their separation from the hub's conventional tubular housing or shell, the apertures of the flanges providing attachment of spokes between them and the rim of the wheel. The included angle between both sets of spokes, in each wheel, is equal or substantially equal in its two angular portions for each of the wheels, front and rear. As to the rear wheel, a substantially uniform tension is provided to both sets of spokes extending between the flanges and the rim, the first set away from the end of the hub housing at which one or more sprockets are mounted and the second set of spokes attaching to the flange adjacent to but disposed in non-interfering manner relative to such sprockets. As the one flange for the second set of spokes is separated (spaced) from the conventional hub, the "dishing" (more fully described hereinafter) used for mounting sprockets on a conventional hub, and which decreased the one angular portion of the included angle thereby introducing a non-uniform tension in the spokes of the rear wheel, no longer prevents both angular portions of the included angle in the rear wheel from being substantially equal. With the angular portions in the rear wheel being substantially equal, by this invention, the rear wheel now has a substantially uniform spoke tension and increased strength. In the front wheel hub arrangement, as the attachment points for the spokes on its flanges have been drawn closer to the wheel's rim, even though a uniform spoke tension existed in this arrangement in a wheel having a conventional hub shell and flanges mounted directly to it, the strength of the front wheel of this invention nevertheless is increased thereby.

In addition, for the wheel (not necessarily limited to the context of this description which places the sprockets on a rear wheel) on which sprockets are added, a ring is mounted on the circumferential member so as to extend towards the cogs of the adjacent sprocket, to maintain the chain on the cogs of such sprocket. Any "dishing" undertaken for mounting sprockets to the hub and wheel assembly does not hinder such addition in view of the novel hub assembly. The addition of the ring eliminates interference between spokes and chain or dropping of the chain into a spatial area which would require halting of bicycling to re-mount the chain to a sprocket and to determine whether damage in some way has occurred to the hub assembly. The present configuration of subject matter of the invention does not lend itself to any interference between spokes and chain but only as a safeguard against the chain coming off its sprocket.

It is to be noted that the distance from the axis of the hub's housing to the flanges, for both front and rear wheels, by reason of the invention's novel hub assembly, produces a wider included spoke angle for the front wheel without exceeding the bike's industry standard distance between the forks of the bike, presently 100 mm for the front wheel. A present 130 mm industry standard for the rear wheel, between the forks of the bike, also remains valid with this invention, while uniformed tension of its both sets of spokes is realized. These particular mm measurements do not limit the invention thereto. A primary advantage of shortened lengths of spokes, and an evenly divided included angle, for front and rear wheels, by this invention, is strength to the wheels, never before achieved now.

A clear advantage with this invention is that the flanges for the spokes, were they to be measured in diametrical terms, are of a greater diameter than the dimension of the largest sprocket, as it is no longer required to remove a set of sprockets to either change or replace spokes for any reason.

An object of this invention is to provide a stronger spoked wheel, particularly as to a bicycle wheel.

Another object of this invention is to provide a novel hub assembly.

A further object of the invention is to provide a bicycle wheel and its hub assembly which is compatible with a bicycle fork industry standard.

A further object of the invention is to provide a bicycle wheel which does not require a variety of radical designs and materials by which additional strength is sought for the wheel.

Still another object of the invention is to eliminate non-uniform tension between the two sets of a wheel's spokes which with conventional hubs and flanges was created by the "dishing" of the hub to provide sprockets.

A still further object of the invention is to eliminate the necessity of removing a sprocket or its set to replace one or more spokes damaged or otherwise.

Another object of the invention is to provide a novel and efficient member or ring by which the chain is maintained on a sprocket's cogs. A corollary to this object is the object and advantage of eliminating any possibility of interference between spokes and chain.

A further object of the invention is to provide hub assemblies fully compatible with standard frame sets and suspension forks.

These and other objects and advantages of the invention will become more apparent by a full and complete reading of the following description, the appended claims thereto, and the accompanying drawing comprising three (3) sheets of six (6) FIGURES.

BEST MODE OF CARRYING OUT THE INVENTION

Figures 1, 2:
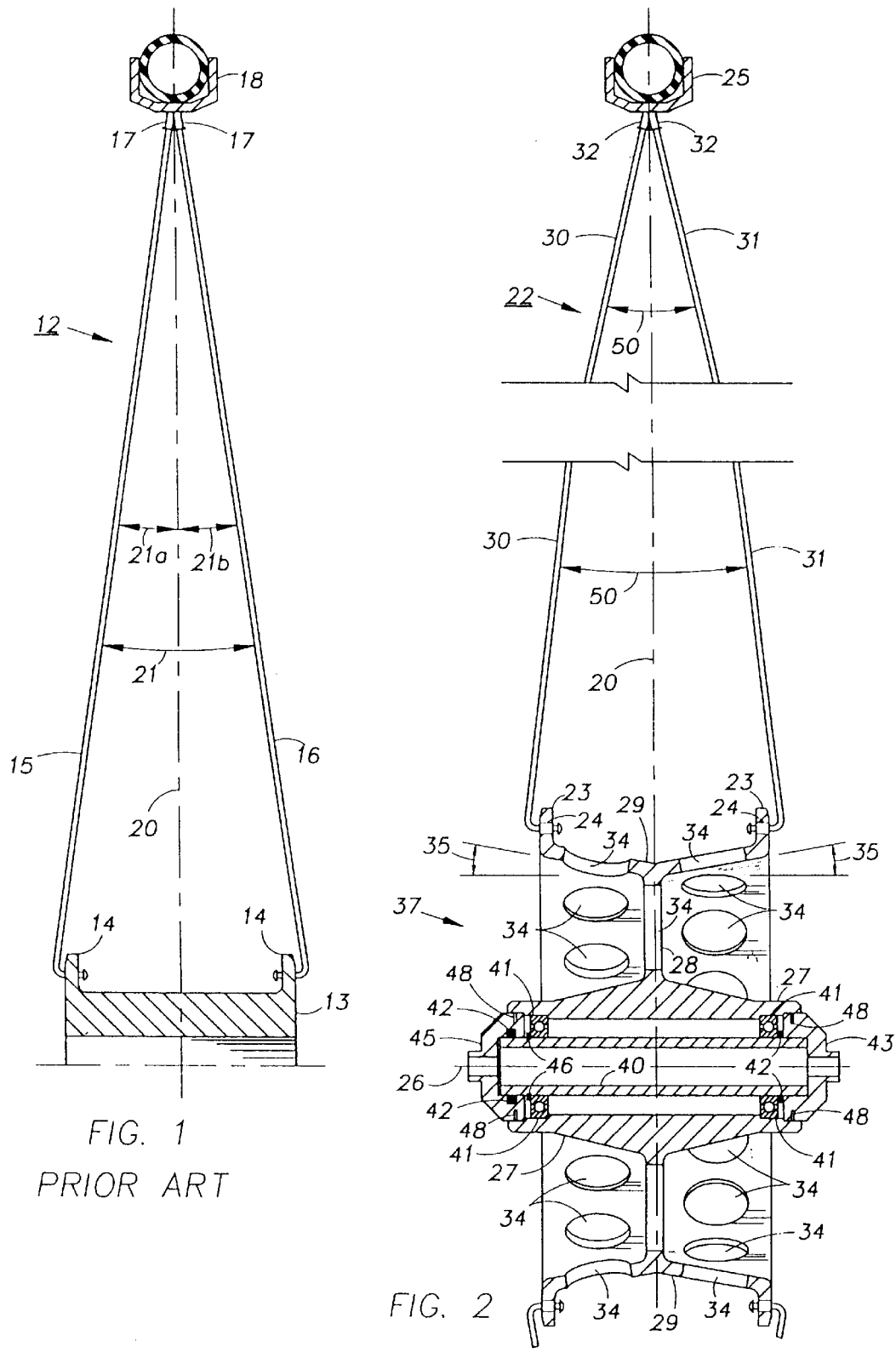
FIG. 1 is a diagrammatical cross-sectional view of a prior art teaching of a conventional hub shell, flanges, spokes, and rim arrangement in a bicycle wheel, only one-half of the wheel being illustrated as the wheel is symmetrical.
FIG. 2 is a diagrammatical cross-sectional view of a wheel that is subject matter of this invention, only one-half of the wheel being illustrated as the wheel is symmetrical.

Referring now to the drawing wherein reference characters correspond to like numerals hereinafter, FIG. 1 illustrates a prior art arrangement of a bicycle front wheel 12 that includes a hub tubular member or shell 13, spaced annular flanges 14 mounted directly on the ends of the shell 13, the flanges 14 having spaced apertures (not visible) through which first and second sets of spokes 15, 16, respectively project and extend outwardly to attach at spaced intervals to corresponding nipples 17 suitably mounted on the rim 18 of the wheel 12. The first set or plurality of spokes 15 are disposed to the left of a center line or plane 20 for the wheel, and the second set or plurality of spokes 16 are disposed to the right of the center line or plane 20. An included angle 21 for both spoke sets 15, 16 includes a first angle portion 21a formed by the first set of spokes 15 with the center line or plane 20 and a second angle portion 21b formed by the second set of spokes 16 with the center line or plane 20. A uniform tension is provided for both sets of spokes by means of known wrench means applied to the nipples 17 to which the threaded ends of the spokes are attached. FIG. 1 is illustrative of a bicycle's front wheel arrangement which includes the hub's shell 13, flanges 14 flaring from its ends and having apertures therein and at which the heads of the spokes 15, 16 are held, while the spokes 15, 16 project through the holes to extend outwardly to the threaded nipples 17 on the wheel's rim 18, and being threadedly secured thereto, all in known manner.

FIG. 2 illustrates a wheel 22 that incorporates the instant invention. Spaced annular flanges 23, with their plurality of spaced apertures 24 therearound, are disposed at a greater distance, closer to a rim 25 for wheel 22, from the axis 26 of a hub housing 27, than are the flanges 14 in a conventional wheel 12. Flanges 23 are detached, i.e., separated or disconnected from direct engagement with their hub housing 27. An annular web 28 is mounted to housing 27, in alignment with or coincident upon the center line or plane 20 of its wheel and on which a member 29 of a circumferential nature or configuration is transversely mounted. The spaced flanges 23 are supported in their locations, such locations usually being less than the length of the housing 27, by the circumferential member 29 and extend outwardly or in the direction of the rim 25. They are positioned in their spaced and generally parallel relationship by means of being fixedly mounted on, such as being integrally formed with, the circumferential member 29. Circumferential support member 29 in turn is fixedly mounted on, such as being integrally form with, web 28 which in turn is fixedly mounted on, such as being integrally formed with, the hub's housing 27. The flanges 23 include suitably spaced apertures 24 for first and second sets, or plurality, of spokes 30, 31 that operatively connect together such flanges 23 and their corresponding nipples 32 spacedly mounted about the bicycle's rim 25 in the same manner as pointed out above regarding the prior art wheel of FIG. 1. The circumferential support member 29 and web 28 include, in both or either one, openings 34, in desired number and size, spaced from one another, for providing a lesser or no greater weight to the assembly of hub housing 27, web 28, circumferential member 29 and apertured flanges 23, as desired.

It is to be noted that circumferential support member 29 is configured in its length in a manner to provide in its extensions from its connection at the web 28 angular inclinations 35, FIG. 2, by which the flanges 23 are drawn again closer to the wheel's rim 25. This has been found to add additional strength to the wheel 22.

As now apparent from FIG. 2, the assembly of the hub's housing 27, the web 28, the circumferential support member 29 and the apertured flanges 23 mounted thereon, constitute an assembly 37 for mounting the wheel's axle 40 that in turn is mounted to a pair of yokes (not shown) on a pair of bike forks (not shown). In today's construction of spoked wheels, particularly bicycle wheels, in regard to axles and hub housings, usually a threaded shaft (not shown) extends through the bore in the axle 40, and it is this threaded shaft that is secured to the yokes on the fork; however, it should be understood that an axle or such a shaft are not part of the instant invention.

As illustrated in FIG. 2, assembly 37 is rotatably mounted about axle 40 by means of ball bearings 41 directly and suitably mounted to axle 40 and on which housing 27 freely rotates. Ball bearings 41 are positioned proximate to the terminal ends of axle 40 and of the hub housing 27. O-rings 42 mount to axle 40, one O-ring 42 between a cap 43 secured at one end of axle 40 and the one ball-bearing 41, while the other O-ring 42 seats in a groove (not visible) formed interiorly of an annular wall of a slip cap 45 mounted to the other end of axle 40. A retaining ring 46 seats in a groove (not visible) formed in the axle's periphery, between the slip cap 45 and its adjacent ball-bearing 41. Non-rotating dust seals 48 are mounted exteriorly in the two annular walls of the caps 43, 45, extending to abut the interior wall of the hub housing 27, and are provided to prevent accumulation of dust and other foreign particles in confines behind the caps.

It now also should be apparent that in the instant invention, an included angle 50 is greater than the included angle 21 of FIG. 1, by reason of the flanges 23 being drawn closer to the wheel's rim 25, the spokes consequentially becoming of shorter length. It should be noted that the illustrated spacing between the flanges 23 and the spacing between the flanges 14 appear to be the same, however, this has no real meaning to understanding the invention as such equality is not necessary for the drawing of the flanges 23 closer to the rim 25 in the practice of the invention. Strengthening of the wheel results partly to the drawing closer of the flanges 23 and not that the spacing between flanges 23 and the spacing between the flanges 14 are the same.

The included angle 50 continues, as in present state-of-the-art bicycle front wheels, to provide even or uniform spoke tension to both sets of spokes 30, 31, on both sides of the wheel's center line or plane 20. It is to be noted that the center line or plane 20 of both wheels, both in old wheels and in this invention, crosses the mid-point of a distance measured or substantially measured between the bicycle's forks, or other supports, and that in this invention web 28 is disposed in alignment or coincidence with the wheel's center line or plane 20.

Figures 3, 4:
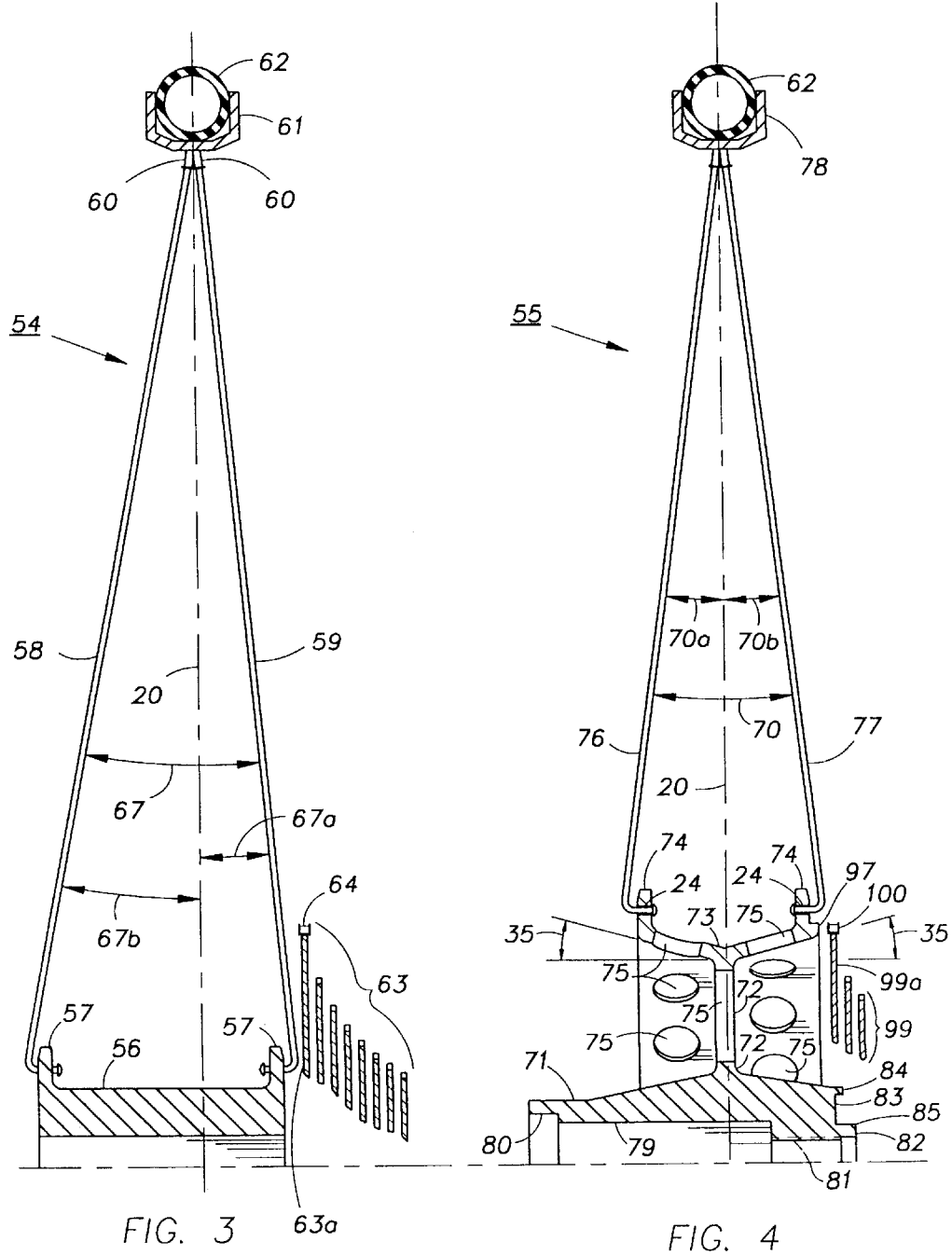
FIG. 3 is a diagrammatic cross-sectional view of a prior art teaching that illustrates the conventional arrangement of one or more sprockets in dished relationship to spokes and hub in a bicycle wheel, only one-half of the wheel being illustrated as the wheel is symmetrical.
FIG. 4 is a diagrammatic cross-sectional view of a wheel that is subject matter of the instant invention, and to which one or more sprockets are mounted, only one-half of the wheel being illustrated as the wheel is symmetrical.

Turning now to FIGS. 3 and 4, which illustrate rear or drive wheel assemblies 54, 55, respectively, FIG. 3 represents a prior art arrangement of an assembly 54 of a hub shell 56, its flanges 57 directly mounted thereon, both sets of spokes 58, 59, the wheel's nipples 60, rim 61, tire 62, a number (usually more than one) of sprockets 63 fixedly mounted (not visible) in known manner to the hub's shell 56 whereby one or more different gearing ratios of pedal swing for speed of bike is attainable, and a chain 64 mounted on the sprocket 63a adjacent the second set of spokes 59 and the one end of the hub shell 56. Chain 64 is disposed above the attachment of both sets of spokes 58, 59, but particularly as to the second set of spokes 59 which are most likely to be interfered with as they are immediately next to the adjacent flange 57. It is to be noted that the wheel's line or plane 20 is maintained at the central point of the distance between a bike's forks, however, the one end of the shell 56 is shortened to provide for the addition of the set of sprockets 63 and which are included within the noted distance between the forks. The result is that the second set of spokes 59 form an angle portion 67a, in an included angle 67, closer to the line or plane 20 than the angle portion 67b that is formed with the first set of spokes 58 to the left of the line or plane 20. Here, the lengths of the spokes for both sets are not the same, setting up a non-uniform tension in the spokes and which contributes to a weakness for the wheel as a result of a "dishing" technique that introduces one or more sprockets 63 which are mounted to the shortened end of the shell 56. The "dishing" technique is well known and utilized in the bike industry, keeping in mind that the entire width of the rear or drive hub shell 56 and sprockets 63 must be limited to the distance between yokes on a bicycle's forks. In other words, the depth of a desired number of sprockets 63 dishes out, i.e., eliminates, a length of the shell 56, making it shorter, so that such number of sprockets can be mounted to a cassette 69 (carrying the sprockets; see FIG. 6) that in turn is bolted to the shortened end of the shell 56, while the one flange 57 remains mounted directly on the shortened end of shell 56 and a greater angle portion 67b and shorter spokes in the first set of spokes results and a smaller angle portion 67a and longer spokes in the second set of spokes results with, as noted, an unequal or non-uniformed tension occurs between the first and second set of spokes. When a force or thrust is imparted to the rim at 90 degrees to the center line or plane 20, not absorbed by the wheel, the second or longer set 59 tend to stretch and the spokes in the first set 58 tend to collapse. When a force or thrust is imparted to the rim at 90 degrees to the center line or plane 20, not absorbed by the wheel, spokes in the first set 58 tend to stretch while the spokes in the second set 59 tend to collapse. The disadvantage of weakness in the wheel is reflected in these circumstances of one or both sets of spokes being struck.

Before a number of sprockets 63 (which themselves come in a set) can be mounted onto the rear or drive shell 56, as noted, the length of the hub or body at its one end is shortened to accommodate a cassette 69 (not shown in FIG. 3) on which the sprockets when mounted thereto rotate in one direction but not the other. The hub's shell 56 is adapted (not visible) in known manner for mounting the cassette 69 thereto.

A weakness in the wheel is inherent by reason of these noted features in a state-of-the-art rear or drive hub shell. The instant invention removes this weakness by providing substantially equal or uniform spoke tension in the spokes to both sides of the wheel's center line or plane 20.

Turning now to FIG. 4 which illustrates the instant invention, the rear wheel's assembly 55 includes an included angle 70 as in conventional rear wheel assemblies, being formed of substantially equal angle portions 70*a* and 70*b* and by which substantially uniform tension in its spokes is achieved, hub housing 71, a web 72, a circumferential support member 73 with its angular inclinations 35 transversely mounted on web 72, the spaced annular flanges 74 mounted on the circumferential support member 73, openings 75, and first and second sets of spokes 76, 77 connecting the flanges 74 to rim 78 (its nipples, i.e.) of the assembly by means of a plurality of apertures 24 in the flanges 74, are like or similar to their counterparts in the FIG. 2 front wheel assembly, however, the width of the circumferential support member 73 is not as wide as that in the assembly shown in FIG. 2. The web 72 continues to align or to coincide with the wheel's line or plane 20 that remains midway of the distance between a bike's forks (or another vehicle's supports) to which the hub housing 71 is to mount. The end of housing 71 which accepts cassette 69 (carrying sprockets 99, FIG. 4) is configured to mate with cassette 69.

Figure 6:
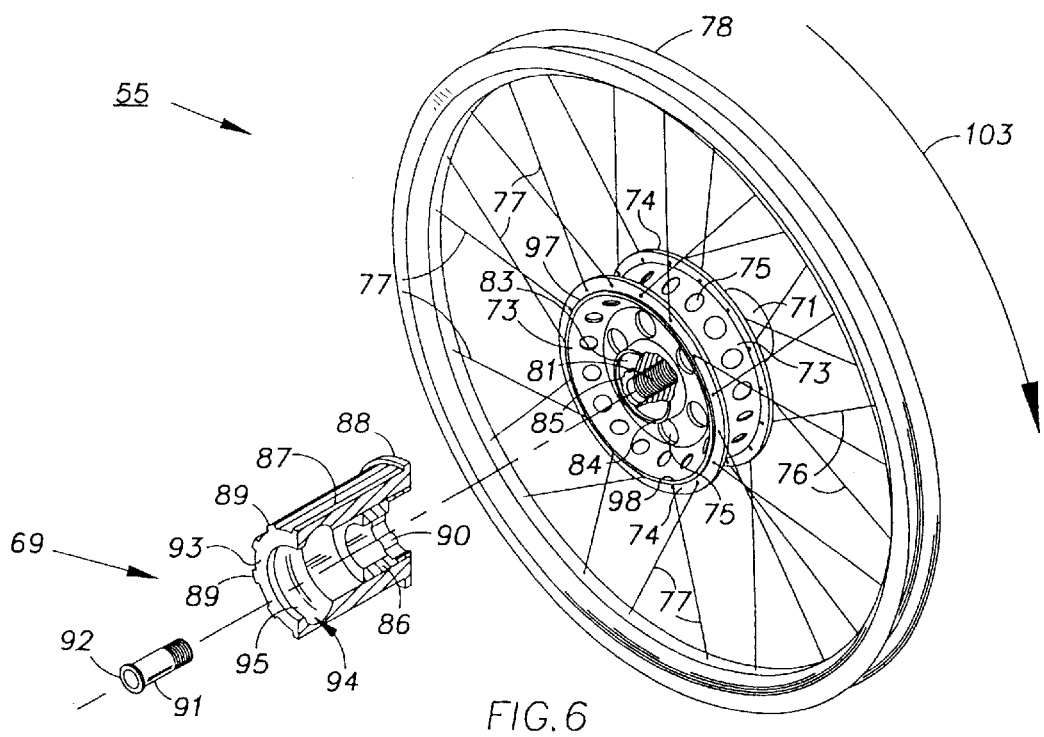
FIG. 6 is a perspective view of the wheel of FIG. 4, partially broken away and with the addition of a state-of-the-art sprocket cassette partially broken away and shown in an exploded relationship to the wheel.

As shown in FIG. 4, the length of the housing 71 to the left of the center line or plane 20 extends to meet the bike's fork (not shown) to which it is to be mounted. Housing 71 includes a bore 79 through which axle (not shown) and shaft (not shown), if any, extend, the left end of the housing's bore 79 including a relief 80 for bearings (not shown) on which the housing rotates. The same size of the bore 79 does not extend to the other end of housing 71, but terminates at a point where the housing becomes thicker and at which a smaller threaded bore 81 begins. The threads of bore 81 do not continue to its other terminus which is a circular boss 82 that extends slightly beyond the end of the housing 71. A relief surface 83 is formed short of the peripheral edge 84 at the end of the housing 71, and from which relief surface 83 the circular boss 82 and its bore extends to its terminus. A series of gear-like teeth 85 with corresponding notches is formed on the outside wall of the circular boss 82, between the relief surface 83 and the boss's terminus. This relief surface 83 and peripheral edge 84 provide for abutting and capturing one end of cassette 69, FIG. 6, to which a set of sprockets 99 is to be mounted. An example of such a cassette, briefly described below and partially illustrated in FIG. 6, is a Shimano Hyperdrive C Body M737 8SP, available from Shimano America, One Shimano Drive, Irvine Calif. (U.S.A.) 92618, here being briefly described to show adaptation between it and the housing 71. It should be understood that the instant invention does not extend to one or more sprockets or their present-day marketed cassette(s) on which they are mounted. The cassette(s), on which a set of sprockets) are suitably mounted, are available store-boughten items, and are operatively connected to the housing 71. The invention's rear or drive wheel's hub housing's construction or configuration is readily adaptable to accommodate or accept the mounting of an available marketplace cassette, such as the Shimano illustrated in FIG. 6, in the same general manner as in the case of such a cassette being adapted to conventional rear wheel hub shell configurations. FIG. 4, with FIG. 6, illustrate the adaptation of the subject matter of the instant invention to a cassette 69.

Cassette 69 comprises a bored interior circular member 86 and an exterior circular member 87 thereabouts that is ball-bearingly mounted to the interior circular member 86, along with (known) means (not shown) to provide rotation in only one direction for the exterior circular member 87 about the bored interior circular member 86. The one end 88, FIG. 6, of the cassette 69 fits to the relief surface 83 within the peripheral edge 84 of housing 71 in assembly. The outside wall of the exterior circular member 87 includes longitudinally disposed splines 89 to which the sprocket set (not shown) is mounted by means of complementing keys and notches (not shown) formed interiorly of a circular band (not shown) along the outside of which one or more sprockets 63 are suitably securely mounted. One (not shown) of the splines 89 and one of the keys (not shown) are of different dimensions than their corresponding counterparts, to provide a proper connection, glove-like, of the sprocket set to cassette 69.

The bored interior circular member 86 includes adjacent to the cassette end 88 inwardly radially extending projections 90 disposed within a cavity the ends of which projections 90 not interfering with its bore but which mate in assembly with the teeth 85 and its notches formed on the housing's circular boss 82, so as to provide a fixed and rotatable relationship with the housing 71. A hollow threaded bolt 91, in-including a perimetrical rim 92 at its head, inserts through the bore of the interior circular member 86, for threading to the threads of the smaller threaded bore 81 in housing 71. Bolt 91 is formed to accept an Allen wrench (not shown) for threading it in and out of the housing 71. The perimetrical rim 92 of the bolt's head seats against the end of the interior circular member's bore when such member is secured to the hub housing 71, thereby securing the cassette thereto.

Adjacent the other end 93 of cassette 69, beyond the perimetrical rim 92 when its bolt 91 is fastened to housing 71, a cavity 94 is provided in the exterior circular member 87 and in communication with the bore of the interior circular member 86, and a ball-bearing race 95 is formed in the body formation forming the cavity 94, for mounting a ball-bearing set (not shown). The ball-bearing set itself includes the other of the two (2) races for the ball-bearings in the set, the set seating and held properly in its races, within cassette 69, when the housing 71 and cassette 69 are mounted and secured to the forks of a bicycle.

Again to FIGS. 4 and 6, a circumferential ring 97 is formed along the perimeter 98 of the support member 73, extending in a direction towards the cogs on the adjacent sprocket 99*a* of a set of sprockets 99, and in general alignment with them, to maintain a chain 100 on the sprocket's cogs during operation of the bicycle or other spoked vehicle. At times, over-shifting of the gears (not shown) being an example, chain 100 would jump from its cogs, interfering with and damaging spokes, as it appears from FIG. 3 wherein were the chain 64 to jump from the adjacent sprocket it would fall towards the shell 56 and become jammed with the rotating spokes 59 of the second spoke set. With the conventional wheel hub arrangements of FIG. 3, it would be necessary to remove sprockets to remount the spokes on the one flange 57. The ring 97 maintains the chain 100 on the sprocket's cogs, as shown in FIG. 4, and the location of the spokes 76, 77 are above or outside the dimensions of chain 100 and ring 97. The ring 97 extends towards chain 100 and its adjacent sprocket 99a to the extent necessary to maintain the chain on its cogs without interfering with operation of the chain on its cogs during operation of the invention.

It is to be noted in the instant invention that for both front and rear wheels, the hub housing, web, and circumferential member provide for an included angle having equal or substantially equal portions of its angle to each side of the wheels' center line or plane 20. The tension desired in the spokes then is equal or substantially equal for both sets of spokes in each of the wheels and provides for a strength in each of the wheels never before attained in spoked wheels, removing weakness that heretofore was inherent in both front and rear or drive wheels.

Weakness is erased or withdrawn, in the front wheel by reason of a larger included angle now for the (shorter) spokes and by the flanges being disposed closer to the rim, and in the rear or drive wheel a uniform tension in both sets of spokes along with its included angle. The angular inclinations 35 in the circumferential members 29, 73, to each side of the wheels' center line or plane 20, contributes to additional strength. The total strength, for example, is manifest in actual biking when a front wheel that includes the instant invention, in turning, bouncing or being pushed to the ground, no longer collapses or otherwise is damaged.

Figure 5:
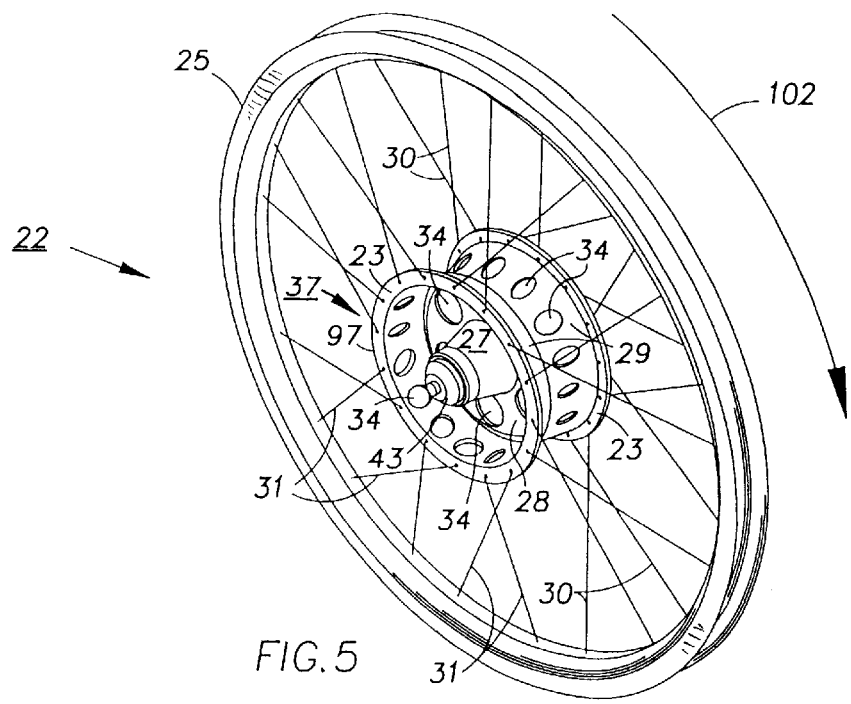
FIG. 5 is a perspective view of the wheel of FIG. 2.

In operation of the invention, as the spoked vehicle is propelled, the front and rear or drive wheels of the invention rotate in normal fashion, as shown by the arrows 102, 103, in FIGS. 5 and 6. As both wheels and their sets of spokes are impacted with thrusts and forces from different directions, the increased strengths therein and the substantially equal and substantially uniform tension in both sets of spokes in both wheels, ably take such forces and thrusts without damage or collapse of either of the wheels, while the circumferential ring 97 on the circumferential support member 73 maintains chain 100 on the cogs of its adjacent sprocket 99a, as described and explained above.

In assembly, for the front wheel and its hub assembly, after the hub housing, web, circumferential member, and apertured flanges have been fabricated, such as by being integrally produced from a suitable solid aluminum billet through CNC [computerized numerical control] techniques, the spokes 30, 31 are connected to their nipples 32 on rim 25 and to flanges 23 in known manner. In the assembly of the rear or drive wheel, the hub assembly also being fabricated by CNC techniques from a suitable solid aluminum billet, the one end 88 of the cassette 69 is abutted to the relief surface 83 of the housing 71 as the cassette's bored interior circular member 86 with its projections 90 and corresponding notches mate with the housing's gear-like teeth 85. The fastening bolt 91 then is threaded in place to the housing 71 by inserting it into the bore of the interior circular member 86 and threading it, by means of an Allen wrench, to the threads of the smaller bore 81 in housing 71, to secure cassette 69 thereto. The sprocket set 99 then is mounted to cassette 69 by means of the keys on the band (on which the sprockets are fixedly mounted) mating with splines 89 on cassette 69, its one key and spline being of a different measurement than their corresponding counterparts to provide a proper mating of the two. The hub assembly and cassette now are ready for further assembly with spokes, rim and tire in known manner, either to themselves or to a spoked bicycle or vehicle in general. Thereafter the wheel assembly 55 with its mounted cassette 69 and sprockets 99 are ready for mounting an axle and shaft (if there is one) thereto and thereafter, for mounting to the forks or supports of a spoked bicycle or other vehicle in known manner.

The hub assemblies are produced out of solid aluminum billets, the aluminum being of a good grade, the spokes and rims (and tires) from known materials, and the cassette and the sprockets, already purchasable items, are made from steel or other suitable materials.

Various changes and modifications may be made in the construction of the subject matter of the invention without changing the scope or spirit thereof and as set forth in the appended claims hereto. For example, rather than fashioning front and rear hub assemblies from a single solid aluminum billet, their components or portions thereof may be made as individual subassemblies that securely fit and fit together to produce what the billet itself produces.

The practice of the invention is not limited to the spacings being the same for both flanges 23 and 74 of FIGS. 2 and 4, respectively, and which appear to be the same as illustrated in the drawing. For example, the included angle in the invention may be increased (or decreased) by increasing (or decreasing) the annular depth of the web 28 in FIG. 2. It must be remembered that both sets of spokes in a wheel must clear any supports or pair of forks to which the wheel assemblies 22, 55 mount in order for the wheel to rotate. The webs 28, 72 need not be continuously or endlessly formed about their respective housings 27, 71. The angular inclinations 35 for the circumferential support members 29, 73 need not be the same, nor is their omission in the practice of the invention without the inventive concept.

Industrial Applicability

The invention is not only applicable to bicycle wheel and hub assemblies, but to other vehicles having spoked wheels in which installation, within or without the need for considering the spread between a bicycle's forks, or another vehicle's supports of limited (yoke) distance, of the subject matter of the invention would be feasible.

We claim:

1. In a wheel having spoke means and a rim through which the wheel's center plane extends towards a hub assembly, a housing in the hub assembly, the hub assembly having means for operatively connecting the spoke means to the rim, the spoke means comprising first and second sets of spokes connecting said rim and connecting means together, said sets of spokes forming an included angle at said rim substantially equally divided about the center plane for the wheel, the improvement comprising a web mounted to said housing in coincidence with the wheel's center plane and extending in an annular manner about said housing, and circumferential member means transversely mounted on said web, said connecting means formed on and supported by said circumferential member means and thereby being drawn closer to the rim.

2. In the improvement of claim 1, said connecting means comprising flange means included in said circumferential member means and by which their corresponding sets of spokes are connected to the hub assembly.

3. In the improvement of claim 2,
at least one of said flange means angularly inclined towards the wheel's center plane.
4. In the improvement of claim 2 or 3,
said flange means comprising
   a pair of flanges and
   a plurality of apertures spaced from one another in at least on of said flanges for attaching the spokes thereto.
5. In the improvement of claim 1 or claim 2,
said web being of endless formation about said housing.
6. In the improvement of claim 3,
said web being of endless formation about said housing.
7. In the improvement of claim 4,
said web being of endless formation about said housing.
8. In the improvement of claim 2,
said hub assembly adapted for mounting on supports held at a specified distance and having a midpoint,
a length of said housing being shortened to the one side of the midpoint over a length of the housing to the other side of the midpoint.
9. In the improvement of claim 8,
a ring mounted on said circumferential member for maintaining a chain on the cogs of a sprocket adapted for adjacent disposition to said ring.
10. A spoked wheel hub assembly adapted for mounting on supports held at a specified distance and having a midpoint, comprising
   a housing adapted for rotatable mounting about an axle adapted to the supports,
   a length of said housing shortened to the one side of the midpoint over a length of the housing to the other side of the midpoint,
   a web in coincidence with such midpoint and mounted to and about said housing,
   a circumferential member mounted on said web, and
   flange means mounted on said circumferential member for operatively connecting a plurality of spokes thereto.
11. The hub assembly of claim 9 wherein
said flange means comprises
   spaced flanges and a plurality of apertures in each of said flanges for attaching spokes of a wheel thereto.
12. The hub assembly of claim 10 or claim 11 including
a ring formed on said circumferential member for maintaining a chain on cogs of a sprocket adapted for adjacent disposition to said ring.
13. The hub assembly of claim 12 wherein
said circumferential member includes angular inclinations extending from said web.
14. The hub assembly of claim 10 wherein
said circumferential member includes angular inclinations extending from said web.
15. A spoked wheel having a rim through which a center plane for the wheel passes and extends to a midpoint of a specified distance through which the wheel is to be disposed and having flange means for operatively connecting wheel spokes to the rim, comprising
   first and second sets of pluralities of spokes operatively connected to said rim and to said flange means,
   said sets of spokes forming an included angle at said rim and being substantially equally divided about the center plane for the wheel,
   a hub assembly including
      a housing adaptable for rotatable mounting about an axle,
      a web in coincidence with the center plane of the wheel and mounted to said housing, and
      a circumferential member mounted on said web,
   said flange means mounted on said circumferential member.
16. The spoked wheel of claim 15 wherein
said flange means comprises
   a pair of flanges each in spaced relationship to the other, the first set of spokes connected to one of said flanges and the second set of spokes connected to the other of said flanges, and
   a plurality of apertures in each of said flanges for attaching the corresponding sets of spokes thereto.
17. The spoked wheel of claim 15 or claim 16 including
a ring formed on said circumferential member for maintaining a chain on cogs of a sprocket adapted to be disposed adjacent to said hub assembly.
18. A hub assembly for a spoked wheel having a rim, said wheel adapted for mounting between supports the distance between such supports having a midpoint through which a center plane for the spoked wheel passes, comprising
   a housing,
   a length of said housing shortened to the one side of the midpoint over a length of the housing to the other side of the midpoint,
   means for connecting the wheel's spokes to the hub assembly, said connecting means not directly mounted on but separated from said housing, and
   a web in coincidence with such midpoint and mounted to and about said housing,
   said connecting means mounted to said web.
19. The hub assembly of claim 18 wherein
said connecting means comprises
   a circumferential member mounted on and supported by said web.
20. The hub assembly of claim 19 wherein
said circumferential member includes
   a pair of flanges spacedly mounted on said circumferential member and a plurality of spaced apertures formed in each of said flanges for attaching the wheel's spokes thereto.
21. The hub assembly of claim 19 or claim 20 wherein
said circumferential member includes
   angular inclinations by which said connecting means draws closer to the wheel's rim.
22. The hub assembly of claim 21 wherein
said web is of an endless formation about said housing.
23. The hub assembly of claim 18 wherein
said web is of an endless formation about said housing.

* * * * *

UNITED STATES PATENT AND TRADEMARK OFFICE
CERTIFICATE OF CORRECTION

PATENT NO. : 6,068,349  Page 1 of 1
DATED : May 30, 2000
INVENTOR(S) : Henderson et al.

It is certified that error appears in the above-identified patent and that said Letters Patent is hereby corrected as shown below:

Column 11,
Line 9, read "on" as -- one --.
Line 17, read "claim 2" as -- claim 1 or claim 2 --.
Line 39, read "claim 9" as -- claim 10 --.

Signed and Sealed this

Twenty-fifth Day of December, 2001

Attest:

Attesting Officer

JAMES E. ROGAN
Director of the United States Patent and Trademark Office